United States Patent
Cheng et al.

(10) Patent No.: US 10,762,272 B2
(45) Date of Patent: Sep. 1, 2020

(54) PATTERN DENSITY ANALYSIS METHOD

(71) Applicant: Shanghai Huali Microelectronics Corporation, Shanghai (CN)

(72) Inventors: Wei Cheng, Shanghai (CN); Zhonghua Zhu, Shanghai (CN); Fang Wei, Shanghai (CN)

( * ) Notice: Subject to any disclaimer, the term of this patent is extended or adjusted under 35 U.S.C. 154(b) by 5 days.

(21) Appl. No.: 16/203,624

(22) Filed: Nov. 29, 2018

(65) Prior Publication Data

US 2020/0104455 A1    Apr. 2, 2020

(30) Foreign Application Priority Data

Sep. 30, 2018   (CN) .......................... 2018 1 1154697

(51) Int. Cl.
| | | |
|---|---|---|
| G06F 30/398 | (2020.01) | |
| G06F 119/18 | (2020.01) | |
| G06F 30/39 | (2020.01) | |
| H01L 27/02 | (2006.01) | |
| G03F 1/68 | (2012.01) | |
| G06F 30/392 | (2020.01) | |

(52) U.S. Cl.
CPC ........ *G06F 30/398* (2020.01); *G06F 2119/18* (2020.01)

(58) Field of Classification Search
CPC .. G06F 17/5081; G06F 17/50; G06F 2217/12; G06F 2119/18; G06F 30/398; G06F 30/392; G06F 30/39; G06F 119/18; G03F 1/68; H01L 27/0207; H01L 27/02
See application file for complete search history.

(56) References Cited

U.S. PATENT DOCUMENTS 6,484,300 B1 * 11/2002 Kim .................... G06F 17/5018
716/51

* cited by examiner

*Primary Examiner* — Vuthe Siek
(74) *Attorney, Agent, or Firm* — Kilpatrick Townsend & Stockton

(57) ABSTRACT

The present disclosure provides a pattern density analysis method for analyzing a local pattern density of a layout, the method comprising: obtaining a pattern attribute of each layout pattern located on a layout region to be analyzed; setting, for each layout pattern, a relevant window for the layout pattern based on the corresponding pattern attribute; calculating the pattern density of each relevant window; and selecting the maximum value of the pattern densities of the relevant windows as the maximum local pattern density of the layout, and selecting the minimum value of the pattern densities of the relevant windows as the minimum local pattern density of the layout.

8 Claims, 7 Drawing Sheets

PATTERN DENSITY ANALYSIS METHOD

CROSS-REFERENCES TO RELATED APPLICATIONS

The present application claims priority to Chinese Patent Application No. 201811154697.2, filed on Sep. 30, 2018, entitled "PATTERN DENSITY ANALYSIS METHOD", which is incorporated by reference herein for all purposes.

FIELD

The present disclosure relates to the field of design for manufacture (DFM) of patterns, and particularly to the field of design for integrated circuit layouts.

BACKGROUND OF THE DISCLOSURE

Design for integrated circuit layouts is an important part of design for manufacture of patterns. With the development of integrated circuit technology, the complexity of integrated circuit layout patterns has been continuously improved, and pattern density analysis has become an important step in the analysis of many key levels of mask layout data.

In a semiconductor manufacturing process, uniform distribution of pattern densities has a great effect on an etching process and a chemical mechanical grinding process. In the case of uneven distribution of the pattern densities, a load effect in the etching is not only easily aggravated, but also a final size of part of patterns deviates from a target size, thereby making it easier to over-grind the pattern in the chemical mechanical grinding process. Therefore, accurately calculating the local density of the layout and finding a high-risk process region will help various module engineers to know the specific position and pattern characteristics of high-risk process hotspots of products in time, and formulate corresponding countermeasures as soon as possible, so as to smoothly achieve the taping out and mass production of the products.

Traditional pattern density analysis is to set an inspection window by means of moving at a fixed step, and perform calculations in a layout, which will miss the features of some patterns, resulting in the deficiency and deviation in density analysis. The traditional pattern density analysis method and the problems thereof are understood with reference to FIGS. 1, 2A, 2B, 3, 4A and 4B.

FIGS. 1 and 3 show a data layout to be analyzed. The shadow part is the layout pattern, and the local pattern density of the layout refers to a region pattern density of a pre-set size of W*W, in the data layout to be analyzed, determined according to the design rule. Therefore, it is necessary to construct an inspection window of a size of W*W in the data layout to be analyzed, and calculate the ratio of the area of a shadow pattern in the inspection window to the area of the inspection window as a local pattern density.

For the data layout to be analyzed shown in FIG. 1, according to the existing traditional pattern density analysis method, the W*W inspection window is constructed by traversing the data layout at a fixed step. The steps of implementing the traditional method are illustrated by way of examples below: Referring to FIGS. 2A and 2B, for example, by taking a left lower vertex of the layout as a starting point, construct a W*W inspection window (such as a thick line frame in FIG. 2A) to the right and upward, and calculate the pattern density in the inspection window. Then, by moving to the right at a step of ½W, construct a W*W inspection window and calculate a pattern density in the inspection window, such as a thick line frame in FIG. 2B, and the dotted line indicates the step of ½W. By analogy, sequentially move the inspection windows at a fixed step till to edges at two sides of the layout and calculate the pattern density within the inspection window each time, so as to obtain a local pattern density of the layout. Although there is a region with a local pattern density being 0% in a middle part of the data layout as shown in FIG. 1, it can be known from the dotted lines shown in FIGS. 2A and 2B that according to the traditional pattern density analysis method, the inspection window with the 0% region cannot be constructed. Therefore, the existing traditional pattern density analysis method has errors and omissions in analyzing the minimum value of the pattern density.

For the data layout to be analyzed shown in FIG. 3, according to the existing traditional pattern density analysis method, the W*W inspection window is constructed by traversing the data layout at a fixed step. The steps of implementing the traditional method are illustrated by way of examples below: Referring to FIGS. 4A and 4B, for example, by taking a left upper vertex of the layout as a starting point, construct a W*W inspection window (such as a thick line frame in FIG. 4A) to the right and downward, and calculate the pattern density in the inspection window. Then, by moving to the right at a step of ½W, construct a W*W inspection window and calculate a pattern density in the inspection window, such as a thick line frame in FIG. 4B, and the dotted line indicates the step of ½W. By analogy, sequentially move the inspection windows at a fixed step till to edges at two sides of the layout and calculate the pattern density within the inspection window each time, so as to obtain a local pattern density of the layout. Although there is a region with a local pattern density being 100% in a middle shadow part of the data layout as shown in FIG. 3, it can be known from the dotted lines shown in FIGS. 4A and 4B that according to the traditional pattern density analysis method, the inspection window with the 100% region cannot be constructed. Therefore, the existing traditional pattern density analysis method has errors and omissions in analyzing the maximum value of the pattern density.

It can be seen therefrom that the traditional pattern density analysis method in the prior art has the defects of missing the features of part of patterns, resulting in the deficiency and deviation in density analysis. Therefore, there is an urgent need for a new pattern density analysis method, which can effectively overcome the above-mentioned problems, accurately calculate a local pattern density of a layout, and obtain the extreme value density, thereby facilitating the monitoring of layout design.

BRIEF SUMMARY OF THE DISCLOSURE

A brief summary on one or more embodiments is given below to provide the basic understanding for these embodiments. This summary is not an exhaustive overview of all the contemplated embodiments and is neither intended to indicate critical or decisive elements of all embodiments nor to attempt to define the scope of any or all embodiments. Its sole purpose is to present some concepts of one or more embodiments in a simplified form as a preface for a more detailed description presented later.

As described above, in order to accurately calculate a local pattern density of a layout, the present disclosure provides a pattern density analysis method for based on a layout pattern attribute, for analyzing the local pattern density of a layout, the method comprising: obtaining a pattern attribute of each layout pattern located on a layout region to be analyzed; setting, for each layout pattern, a relevant window for the layout pattern based on the corresponding pattern attribute; calculating the pattern density of each relevant window; and selecting the maximum value of the pattern densities of the relevant windows as the maximum local pattern density of the layout, and selecting the minimum value of the pattern densities of the relevant windows as the minimum local pattern density of the layout.

As the above-mentioned analysis method, In one embodiment, setting the relevant window further comprises setting, for each layout pattern, a first relevant window and a second relevant window for the layout pattern based on the corresponding pattern attribute, and each layout pattern is located inside the corresponding first relevant window, and each layout pattern is adjacent to the corresponding second relevant window and is located outside the second relevant window; selecting the maximum local pattern density further comprises selecting the maximum value of the pattern densities of all the first relevant windows as the maximum local pattern density; and selecting the minimum local pattern density further comprises selecting the minimum value of the pattern densities of all the second relevant windows as the minimum local pattern density.

As the above-mentioned analysis method, In one embodiment, the obtaining of the pattern attribute of each layout pattern further comprises: obtaining vertex coordinates of the minimum circumscribed rectangle for the layout pattern; and setting the relevant window further comprises: for a coordinate system with each vertex of the minimum circumscribed rectangle taken as the origin, setting, in a quadrant in which the layout pattern is located, a first relevant window with the origin as the vertex, and setting, in at least one of the remaining quadrants, a second relevant window with the origin as the vertex, and the first relevant window and the second relevant window are rectangular.

As the above-mentioned analysis method, In one embodiment, the vertex coordinates of the minimum circumscribed rectangle are A (Xl, Yd), B (Xl, Yu), C (Xr, Yu), and D (Xr, Yd), and Xl and Xr are the coordinates of endpoints of the layout pattern at two sides in an X direction of the layout to be analyzed, and Yd and Yu are the coordinates of endpoints of the layout pattern at two sides in a Y direction of the layout to be analyzed.

As the above-mentioned analysis method, In one embodiment, the analysis method further comprises: comparing the pattern density of each relevant window with a pre-set highest specification to mark a relevant window with the pattern density out of the pre-set highest specification; and/or comparing the pattern density of each relevant window with a pre-set lowest specification to mark a relevant window with the pattern density below the pre-set lowest specification.

As the above-mentioned analysis method, In one embodiment, the relevant window is a W1*W1 rectangle; and before the step of obtaining the pattern attribute, the method further comprises: performing preliminary screening on the layout to obtain the layout region to be analyzed, and the layout region to be analyzed is a W2*W2 rectangle, with W2 being greater than W1.

As the above-mentioned analysis method, In one embodiment, the step of preliminary screening further comprises: setting a W2*W2 inspection window; moving the inspection window along the X and Y directions of the layout at a step of $S=\frac{1}{2}*W2$ to traverse the layout, and calculating the pattern density of the inspection window for each step; and comparing the pattern density of the inspection window for each step with a pre-set screening specification, so as to select a layout region with the pattern density out of the pre-set screening specification in the inspection window as the layout region to be analyzed.

As the above-mentioned analysis method, In one embodiment, the pattern density is the ratio of the area having a layout pattern in the corresponding window to the area of the corresponding window.

The pattern density analysis method provided in the present disclosure can construct an inspection window based on the attribute of the layout pattern, and can more accurately find a region having the maximum density and a region having the minimum density in the layout, thereby more accurately calculating the extreme value density of a local pattern, and avoiding errors and omissions.

REFERENCE SIGNS

700, 800 Inspection window
710, 810 Layout pattern
711, 811 First relevant window
712(1), 712(2), 712(3) Second relevant window
812(1), 812(2), 812(3) Second relevant window

DETAILED DESCRIPTION OF THE DISCLOSURE

In the following detailed description, numerous specific details are set forth to provide a more thorough understanding of the present disclosure. In other words, well-known structures and devices are shown in a block diagram form and are not shown in detail, so as to avoid obscuring the present disclosure.

The reader is cautioned as to all files and documents which are filed at the same time as this specification and which are open for the public to consult, and the contents of all such files and documents are incorporated herein by reference. Unless directly stated otherwise, all features disclosed in this specification (including any of the appended claims, the abstract, and the accompanying drawings) may be replaced by alternative features serving the same, equivalent, or similar purposes. Therefore, unless expressly stated otherwise, each of the features disclosed is only one example of a group of equivalent or similar features.

Figure 5:
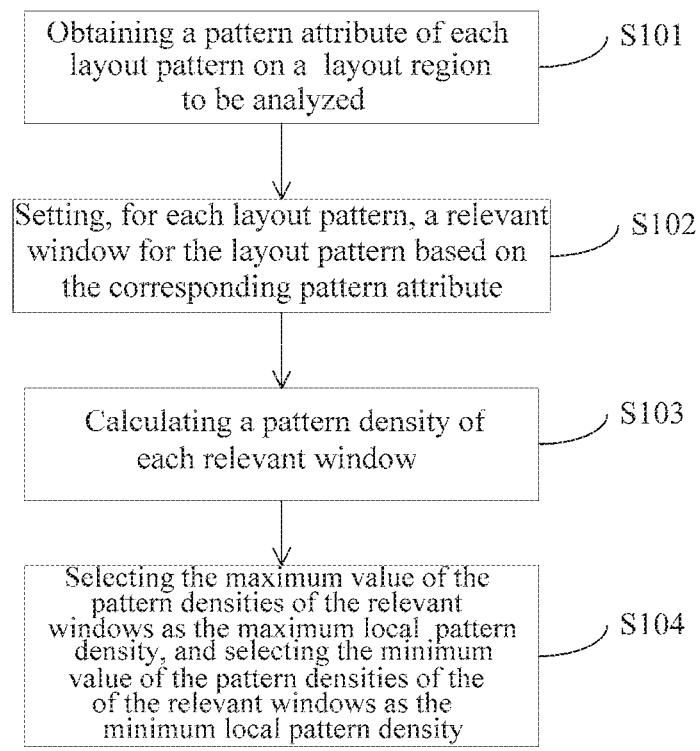
FIG. 5 shows a flow schematic diagram of a pattern density analysis method provided in the present disclosure.

As described above, in order to solve the problem of occurrence of errors and omissions during the pattern density analysis in the prior art, the present disclosure provides a pattern density analysis method, which can construct an inspection window based on the attribute of a layout pattern, so as to accurately and effectively obtain an extreme value density region on the layout pattern, thereby avoiding errors and omissions. FIG. 5 shows a flow schematic diagram of a pattern density analysis method provided in the present disclosure. As shown in FIG. 5, the analysis method provided in the present disclosure specifically comprises: step S101, obtaining a pattern attribute of each layout pattern on a layout region to be analyzed; step S102, setting, for each layout pattern, a relevant window for the layout pattern based on the corresponding pattern attribute; step S103, calculating the pattern density of each relevant window; and step S104, and selecting the maximum value of the pattern densities of the relevant window as the maximum local pattern density, and selecting the minimum value of the pattern densities of the relevant window as the minimum local pattern density.

Specifically, in an embodiment, the pattern attribute obtained in step S101 may be associated with position information about each layout pattern. It can be understood that the layout region to be analyzed may be the entire region of an original data layout or a part of region of the original data layout. In step S102, the set relevant windows are all rectangular inspection windows with a pre-set size of W*W determined according to a design rule, and the size of W is usually between 10 um and 200 um.

In the above-mentioned steps, for each layout pattern, based on the pattern attribute thereof, two types of relevant windows can be separately set. One is a first relevant window that makes the layout pattern be located inside the window, and the other is a second relevant window that makes the layout pattern be located outside the relevant window, and the first relevant window and the second relevant window are both adjacent to the layout pattern. By means of setting the layout pattern inside the first relevant window as much as possible, the first relevant window can be more accurately positioned to the position of a maximum value of the pattern density. Similarly, by means of setting the layout pattern outside the second relevant window as much as possible, the second relevant window can be more accurately positioned to the position of a minimum value of the pattern density.

In step S103, for each relevant window (inspection window), the pattern density thereof is the ratio of the shadow area having the layout pattern in the window to the area of the window. Since the analysis method provided in the present disclosure sets the inspection window based on the pattern attribute of the layout pattern in step S102, the layout pattern density can be inspected more specifically, thereby avoiding the existence of omissions in the analysis method in the prior art.

Therefore, in step S104, the maximum value can be more accurately selected from the pattern density of the relevant window as the maximum local pattern density of the entire layout to be analyzed, and the minimum value can be selected as the minimum local pattern density of the entire layout to be analyzed. In an embodiment where a first relevant window and a second relevant window are respectively set for each layout pattern, since the first relevant window corresponds to the maximum value of the pattern density and the second relevant window corresponds to the minimum value of the pattern density, in step S104, the maximum value may be selected from the pattern density of the first relevant window as the maximum local pattern density of the entire layout to be analyzed, and the minimum value may be selected from the pattern density of the second relevant window as the minimum local pattern density of the entire layout to be analyzed, such that the screening efficiency can be improved.

Preferably, in another embodiment, the analysis method provided in the present disclosure may further comprise: comparing the pattern density of each relevant window with a pre-set specification on the basis of obtaining the pattern density of each relevant window in step S103, so as to mark a region out of spec (OOS). Specifically, the pattern density of each relevant window can be compared with the upper limit of the pre-set specification, so as to mark a relevant window with the pattern density out of the upper limit value of the pre-set specification, so that specific inspection of the region with a higher pattern density and pay attention to the region with the higher pattern density in the subsequent processes. Based on the same concept, the analysis method provided in the present disclosure can also compare the pattern density of each relevant window with the lower limit of the pre-set specification, so as to mark a relevant window with a pattern density lower than the lower limit value of the pre-set specification, so that specific attention may be payed to the region with the lower pattern density.

In the above-mentioned embodiment, if the first relevant window and the second relevant window have been respectively set for each layout pattern in step S102, can directly compare the pattern density of the first relevant window with the pre-set highest specification and compare the pattern density of the second relevant window with the pre-set lowest specification, so as to improve the screening efficiency.

More specifically, in an embodiment, the pattern attribute obtained in step S101 comprises vertex coordinates of the minimum circumscribed rectangle for the layout pattern. In step S102, for each vertex of the minimum circumscribed rectangle for each layout pattern, a coordinate system can be constructed with the vertex as the origin. In this coordinate system, the minimum circumscribed rectangle for the layout pattern is located in a particular quadrant. The first relevant window constructed in step S102 takes the vertex as the origin, and is also located in the particular quadrant where the minimum circumscribed rectangle is located; and the constructed second relevant window also takes the vertex as the origin, but is located in the remaining quadrants that are different from the particular quadrant.

In one embodiment, method provided in the present disclosure can use software to obtain the vertex coordinates of the layout pattern (and/or its minimum circumscribed rectangle), or can be logically calculated by using design data, or can be obtained by means of the existing or future technologies, which will not be described in detail herein.

It can be understood that for one vertex of the minimum circumscribed rectangle, a first relevant window and at most three second relevant windows can be constructed, and can adjust the number of the constructed second relevant windows according to accuracy requirements. For a layout, four first relevant windows and at most twelve second relevant windows can be constructed based on four vertexes of its minimum circumscribed rectangle, and pre-set rules can be used for constructing relevant windows according to accuracy requirements, for example, a certain number of first relevant windows and second relevant windows are constructed only using one or several particular vertexes of the minimum circumscribed rectangle.

Based on the concept of constructing the first relevant window and the second relevant window, it can be known that the analysis method provided in the present disclosure can detect a region with a maximum local pattern density or a minimum local pattern density as best possible, thereby avoiding omissions. Meanwhile, in the above-mentioned embodiments, the analysis method provided in the present disclosure is based on the minimum circumscribed rectangle for the layout pattern, and even if the analyzed layout pattern is a non-rectangular pattern such as a circle, a triangle and a diamond, they are equally applicable to the analysis method provided in the present disclosure. The analysis method provided in the present disclosure has a universal applicability.

In another embodiment, the analysis method provided in the present disclosure further comprises: step S100, screening out the layout region to be analyzed in steps S101-104 in the original data layout. The screening method in step S100 can use the method of moving an inspection window at a fixed step in the prior art, and thus can have the effect of reducing the amount of analysis and calculation. Specifically, for the original data layout, if the regional pattern density of the size of W*W is inspected according to design rule requirements, in step S100, W' that is greater than W is first set according to different process characteristics, and analysis is performed by using the traditional density analysis method in the prior art, and taking ½W' as a fixed step and W'*W' as the size of the inspection window. After the W'*W' inspection window with a density out of the screening specification is screened out, the layout region in the window is taken as the layout region to be analyzed in steps S101-104.

Through the steps of preliminary screening, the analysis method provided in the present disclosure can have both screening efficiency and screening accuracy.

Figure 1:
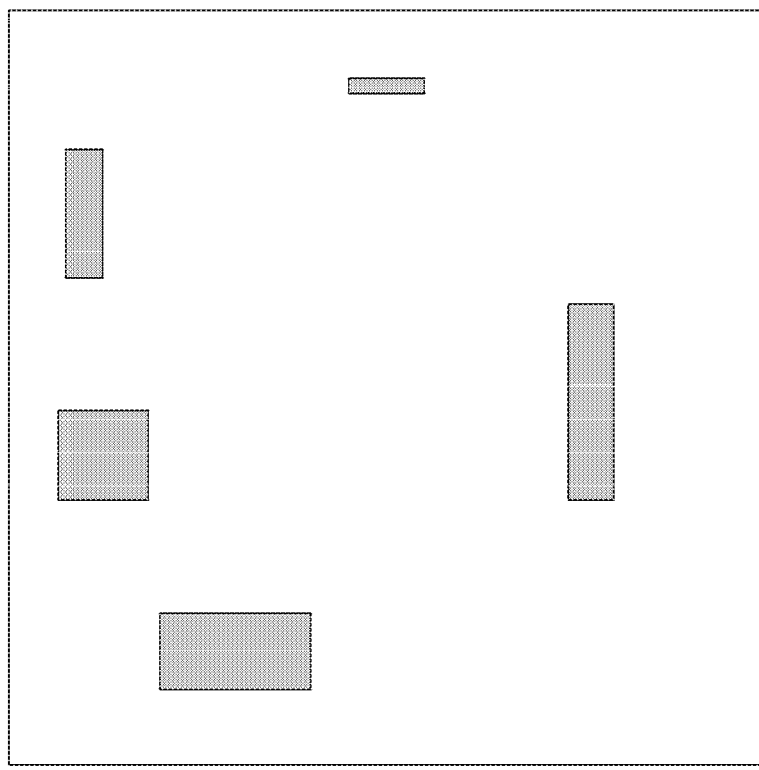
FIG. 1 shows an example of a data layout to be analyzed.
Figure 2A:
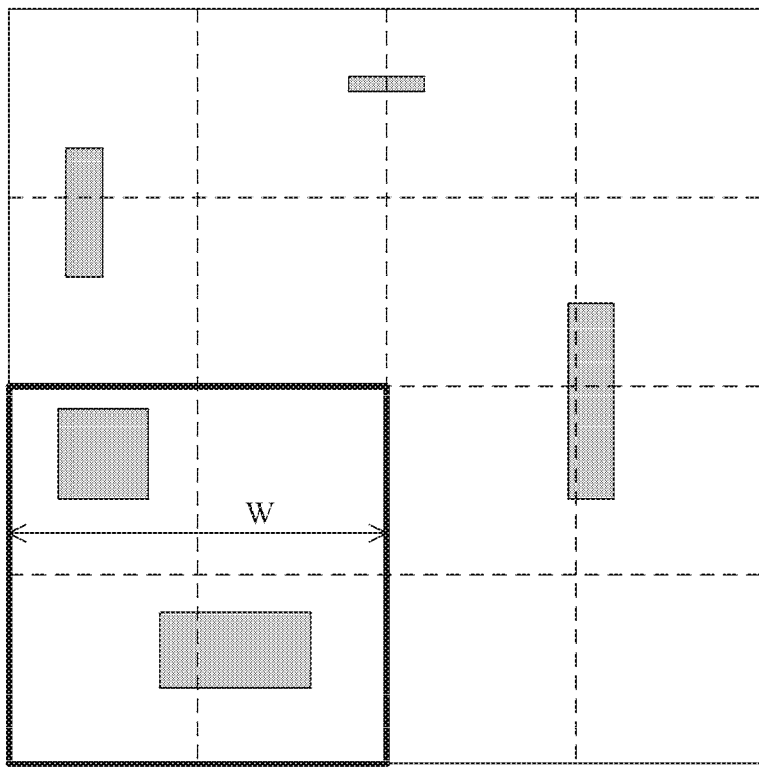
FIGS. 2A and 2B show a schematic diagram of analyzing a local pattern density of the layout shown in FIG. 1 in the prior art.
Figure 2B:
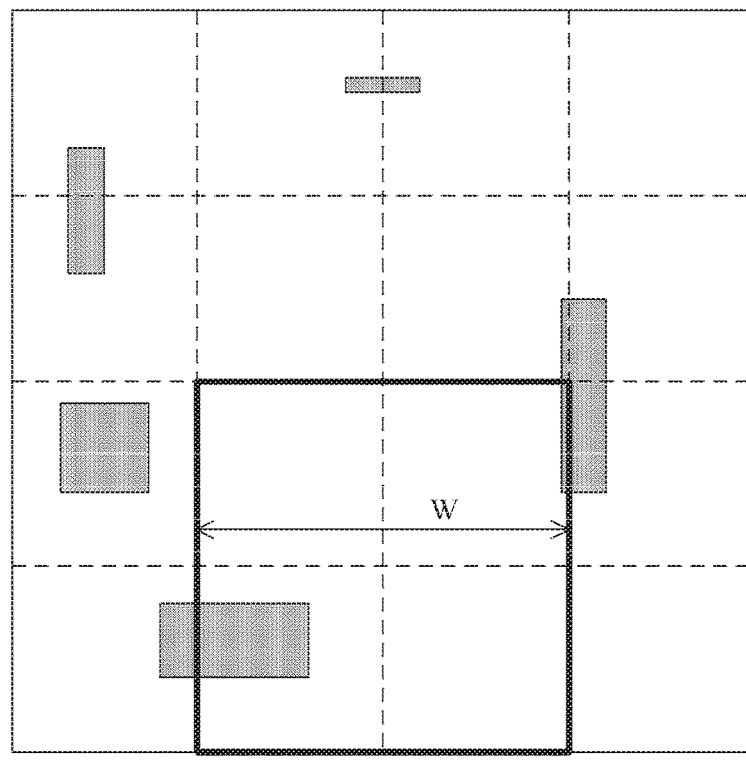
Figure 3:
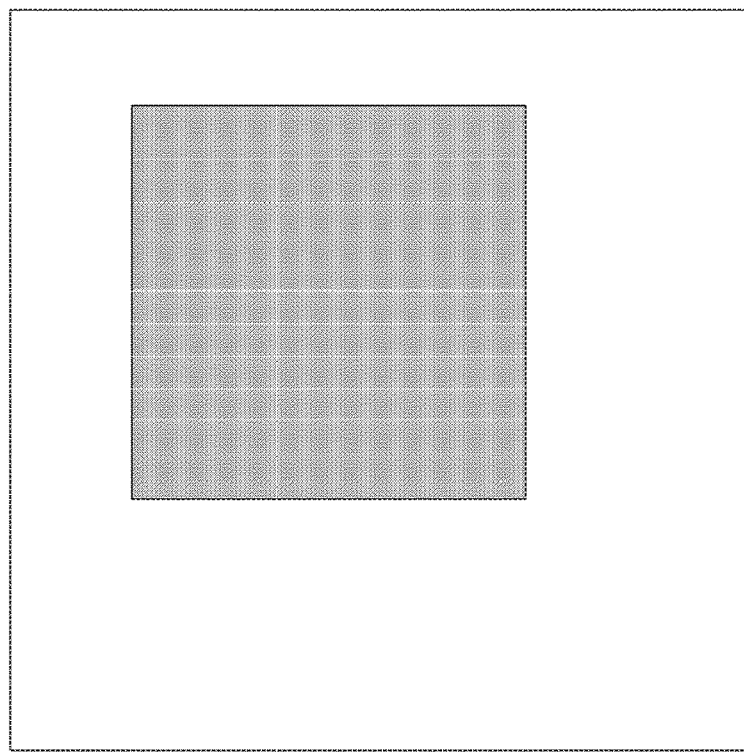
FIG. 3 shows another example of the data layout to be analyzed.
Figure 4A:
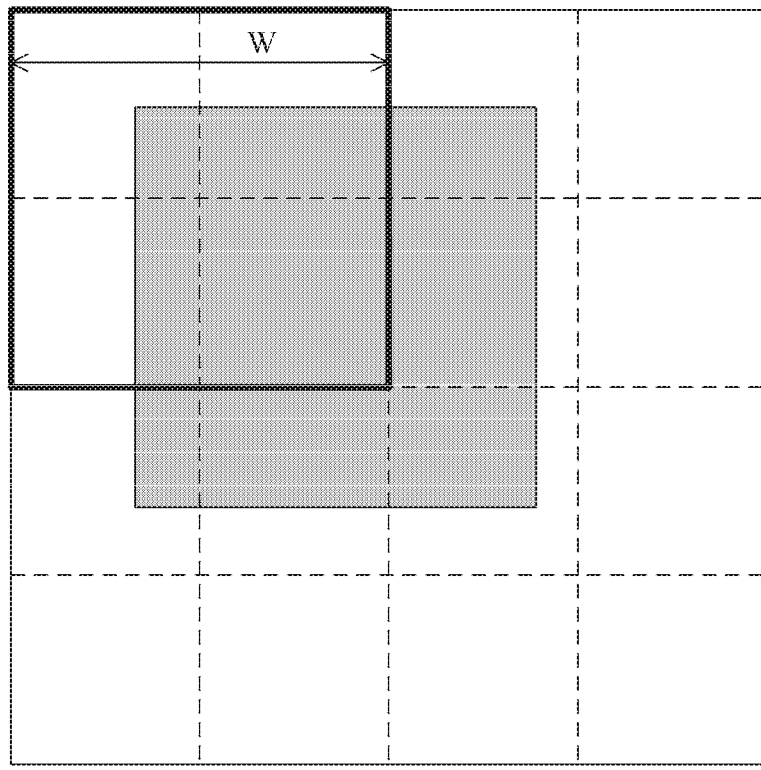
FIGS. 4A and 4B show a schematic diagram of analyzing a local pattern density of the layout shown in FIG. 3 in the prior art.
Figure 4B:
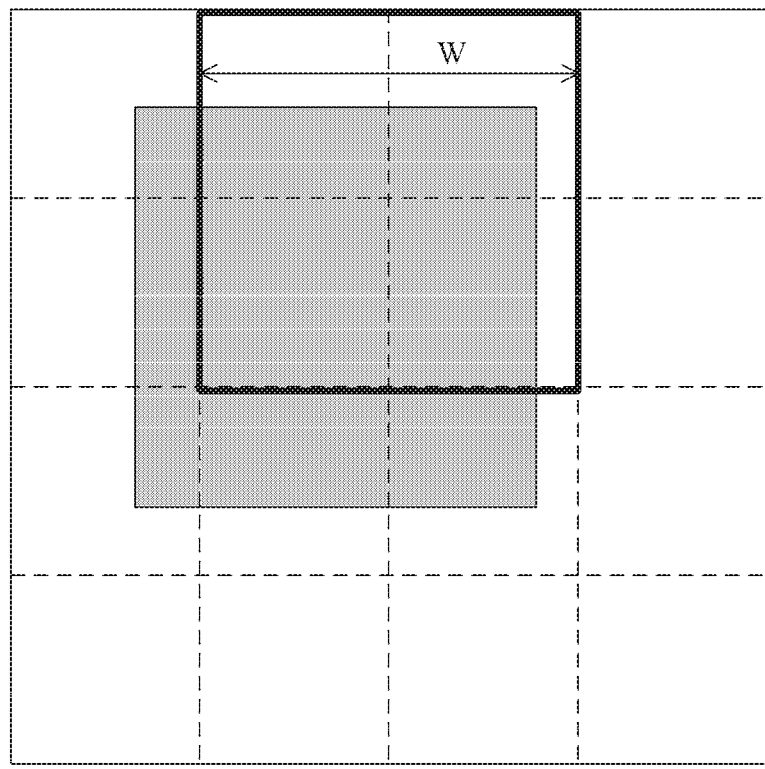
Figure 6:
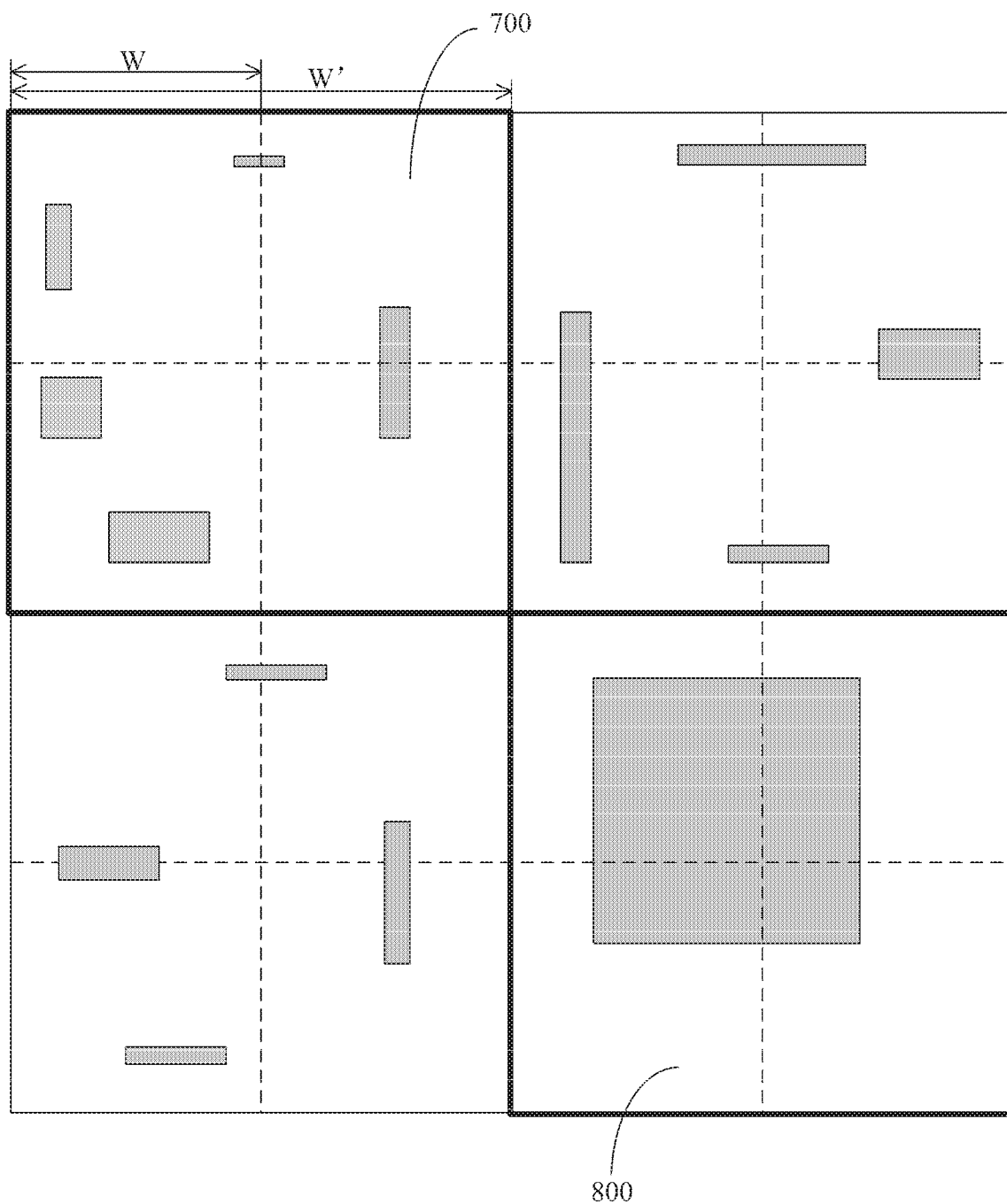
FIG. 6 shows another example of the data layout to be analyzed.
Figure 7:
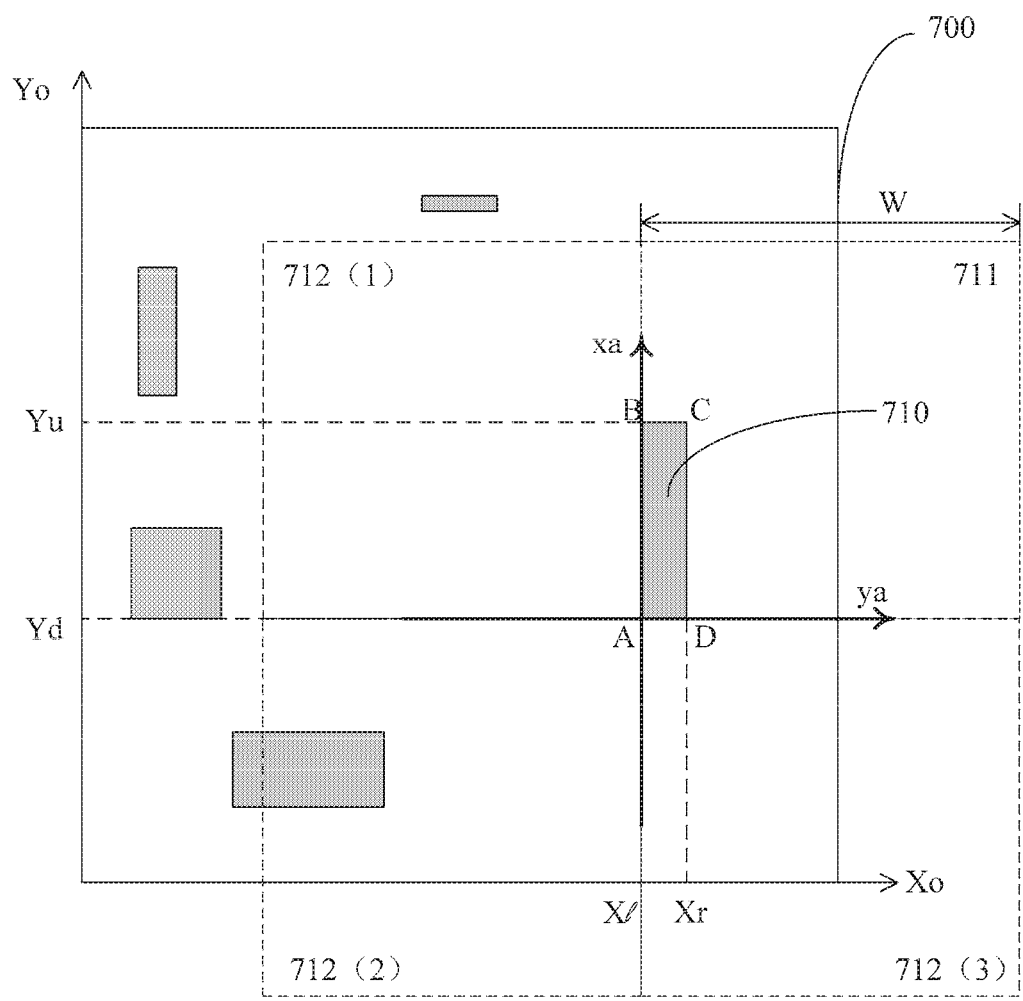
FIG. 7 shows a schematic diagram of analyzing a local pattern density of an inspection window 700 in FIG. 6 in the present disclosure.
Figure 8:
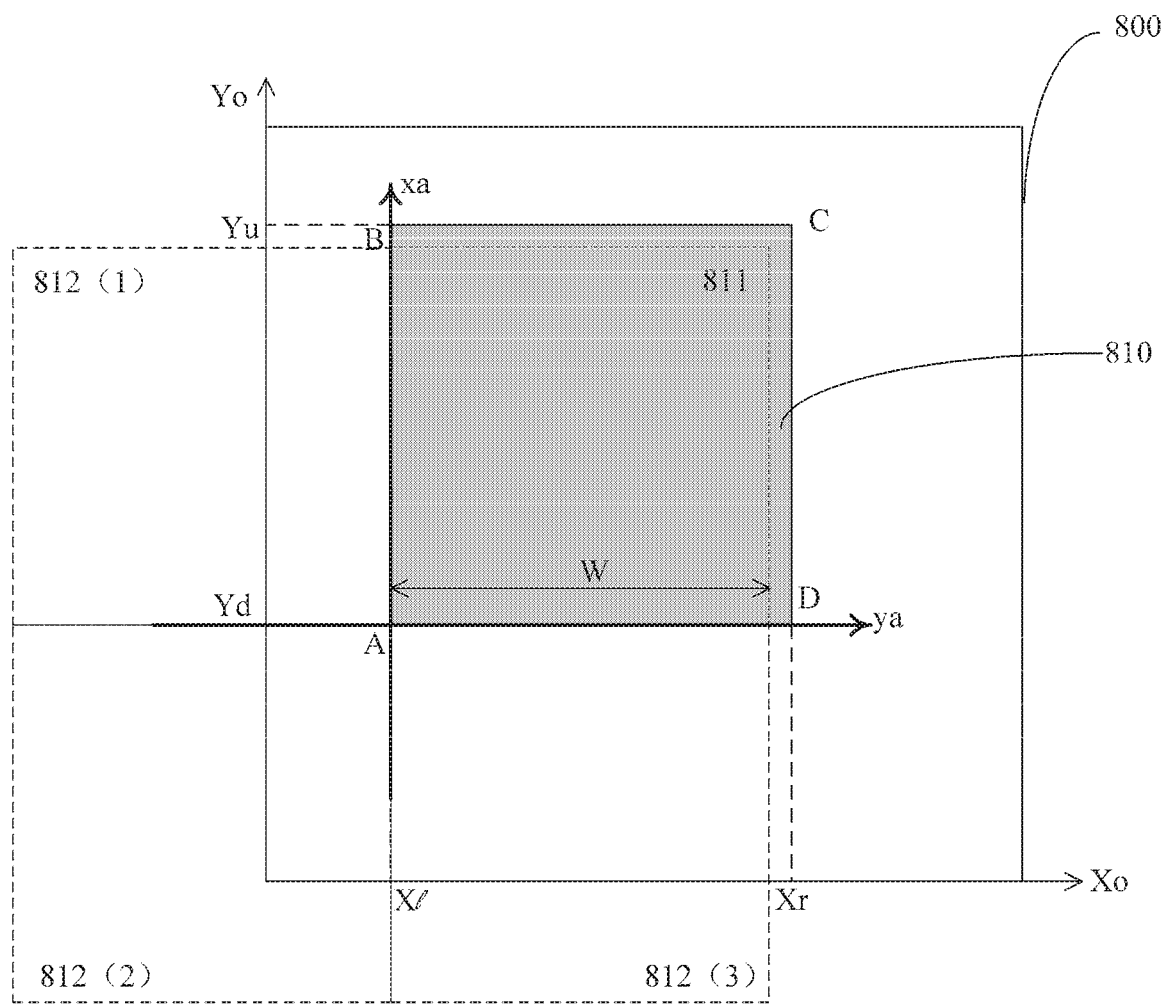
FIG. 8 shows a schematic diagram of analyzing a local pattern density of an inspection window 800 in FIG. 6 in the present disclosure.

The specific implementation process of the analysis method provided in the present disclosure will be further understood below in conjunction with FIGS. 6-8. FIG. 6 shows an original data layout. Since the original data layout shown in FIG. 6 has a large area, an inspection window 700 and an inspection window 800 out of specification that need further analysis may be screened in a step manner according to the existing traditional analysis method. FIG. 7 further shows a layout region to be analyzed in the inspection window 700, and FIG. 8 further shows a layout region to be analyzed in the inspection window 800. It can be seen that FIGS. 7 and 8 show data layouts consistent with those in FIGS. 1 and 3. As described above, according to the existing analysis method, a region with a local pattern density being 0% or 100% in FIGS. 1 and 3 cannot be analyzed. According to the analysis method provided in the present disclosure, the region with the local pattern density being 0% or 100% can be analyzed.

Referring to FIG. 7, a shadow part in FIG. 7 shows five layout patterns on the data layout. For each layout pattern, step S101 is performed: obtaining pattern attributes of the five layout patterns separately. The pattern attributes may be associated with position information about each layout pattern. Further, the pattern attributes may comprise vertex coordinate information about each layout pattern. It can be understood that the vertex coordinate information is relative to a coordinate system Xo-Yo in which a left lower vertex of a layout to be analyzed is taken as the origin and the layout to be analyzed is located in a first quadrant (as shown in FIG. 7). By taking a layout pattern 710 as an example, the layout pattern 710 has four vertexes, namely A (Xl, Yd), B (Xl, Yu), C (Xr, Yu), and D (Xr, Yd), and Xl and Xr are the coordinates of endpoints of the layout pattern at two sides in an Xo direction of the layout to be analyzed, and Yd and Yu are the coordinates of endpoints of the layout pattern at two sides in a Yo direction of the layout to be analyzed.

Since the layout patterns are all rectangular in the embodiment shown in FIG. 7, the minimum circumscribed rectangle for the layout pattern is itself, and for the case where the layout patterns are non-rectangular patterns such as a circle, a triangle and a diamond, by means of setting the minimum circumscribed rectangle for the layout pattern to obtain the vertexes of the minimum circumscribed rectangle, it is equally applicable to the analysis method provided in the present disclosure.

Based on the pattern attributes, step S102 is performed: respectively setting the corresponding relevant windows for the five layout patterns. In an embodiment, for each layout pattern, two types of relevant windows may be separately set. One is a first relevant window that makes the layout pattern be located inside the window, and the other is a second relevant window that makes the layout pattern be located outside the relevant window, and the first relevant window and the second relevant window are both adjacent to the layout pattern. By means of setting the layout pattern inside the first relevant window as much as possible, the first relevant window can be more accurately positioned to the position of a maximum value of the pattern density. Similarly, by means of setting the layout pattern outside the second relevant window as much as possible, the second relevant window can be more accurately positioned to the position of a minimum value of the pattern density.

Still by taking the layout pattern 710 as an example, in the case where the vertex coordinate information about the layout pattern 710 has been obtained, for any one of the vertexes, the corresponding first relevant window and second relevant window may be set. FIG. 7 constructs, by taking the vertex A of the layout pattern 710 as an example, a coordinate system xa-ya with the vertex A as the origin, and in the coordinate system, the layout pattern 710 is located in a first quadrant. The first relevant window 711 constructed in step S102 takes the vertex A as the vertex and is also located in the first quadrant of the coordinate system xa-ya. At most three second relevant windows 712(1), 712(2) and 712(3) may be constructed in step S102, and all of the second relevant windows 712(1), 712(2) and 712(3) take the vertex A as the vertex, but are respectively located in the second quadrant, the third quadrant, and the fourth quadrant of the coordinate system xa-ya.

It can be understood that, for the layout pattern 710, corresponding first or second relevant windows may be respectively constructed for the vertexes A, B, C, and D, or specific one or several vertexes may be selected according to accuracy requirements and the number of the constructed first or second relevant windows may be adjusted. For the remaining layout patterns in the inspection window 700, the construction of the inspection windows is respectively performed according to the method described above, and specific one or several vertexes of the layout pattern may be selected according to the analysis accuracy requirements and the number of the constructed first or second relevant windows may be adjusted.

It can be seen from FIG. 7 that, the data layout shown in FIG. 7 has a region with a local pattern density being 0%. According to the analysis method provided in the present disclosure, with regard to the constructed second relevant window 712(1), it has a pattern density of 0% within the window, and the minimum value of the local pattern density in the data layout as shown in FIG. 7 can be already screened out, which avoids the omissions that the region with the local pattern density of 0% as shown in FIG. 7 cannot be screened out in the prior art.

Referring to FIG. 8, a shadow part in FIG. 8 shows one layout pattern on the data layout. For the layout pattern, step S101 is performed: obtaining pattern attributes of the layout patterns separately. The pattern attributes may be associated with position information about the layout patterns. Further, the pattern attributes may comprise vertex coordinate information about the layout patterns. It can be understood that the vertex coordinate information is relative to a coordinate system Xo-Yo in which a left lower vertex of a layout to be analyzed is taken as the origin and the layout to be analyzed is located in a first quadrant (as shown in FIG. 8). By taking a layout pattern 810 as an example, the layout pattern 810 has four vertexes, namely A (Xl, Yd), B (Xl, Yu), C (Xr, Yu), and D (Xr, Yd), and Xl and Xr are the coordinates of endpoints of the layout pattern at two sides in an Xo direction of the layout to be analyzed, and Yd and Yu are the coordinates of endpoints of the layout pattern at two sides in a Yo direction of the layout to be analyzed.

Since the layout patterns are rectangular in the embodiment shown in FIG. 8, the minimum circumscribed rectangle for the layout pattern is itself, and for the case where the layout patterns are non-rectangular patterns such as a circle, a triangle and a diamond, by means of setting the minimum circumscribed rectangle for the layout pattern to obtain the vertexes of the minimum circumscribed rectangle, it is equally applicable to the analysis method provided in the present disclosure.

Based on the pattern attributes, step S102 is performed: setting a corresponding relevant window for the layout patterns. In an embodiment, for each layout pattern, two types of relevant windows may be separately set. One is a first relevant window that makes the layout pattern be located inside the window, and the other is a second relevant window that makes the layout pattern be located outside the relevant window, and the first relevant window and the second relevant window are both adjacent to the layout pattern. By means of setting the layout pattern inside the first relevant window as much as possible, the first relevant window can be more accurately positioned to the position of a maximum value of the pattern density. Similarly, by means of setting the layout pattern outside the second relevant window as much as possible, the second relevant window can be more accurately positioned to the position of a minimum value of the pattern density.

Still by taking the layout pattern 810 as an example, in the case where the vertex coordinate information about the layout pattern 810 has been obtained, for any one of the vertexes, the corresponding first relevant window and second relevant window may be set. FIG. 8 constructs, by taking a vertex A of the layout pattern 810 as an example, a coordinate system xa-ya with the vertex A as the origin, and in the coordinate system, the layout pattern 810 is located in a first quadrant. The first relevant window 811 constructed in step S102 takes the vertex A as the vertex and is also located in the first quadrant of the coordinate system xa-ya. At most three second relevant windows 812(1), 812(2) and 812(3) may be constructed in step S102, and all of the second relevant windows 812(1), 812(2) and 812(3) take the vertex A as the vertex, but are respectively located in the second quadrant, the third quadrant, and the fourth quadrant of the coordinate system xa-ya.

It can be understood that, for the layout pattern 810, corresponding first or second relevant windows may be respectively constructed for the vertexes A, B, C, and D, or specific one or several vertexes may be selected according to accuracy requirements and the number of the constructed first or second relevant windows may be adjusted. For the remaining layout patterns (if present) in the inspection window 800, the construction of the inspection windows is respectively performed according to the method described above, and specific one or several vertexes of the layout pattern may be selected according to the analysis accuracy requirements and the number of the constructed first or second relevant windows may be adjusted.

It can be seen from FIG. 8 that, the data layout shown in FIG. 8 has a region with a local pattern density being 100%. According to the analysis method provided in the present disclosure, with regard to the constructed first relevant window 811, it has a pattern density of 100% within the window, and the minimum value of the local pattern density in the data layout as shown in FIG. 8 can be already screened out, which avoids the omissions that the region with the local pattern density of 100% as shown in FIG. 8 cannot be screened out in the prior art.

Accordingly, it can be known that the local density analysis of the traditional layout pattern may cause some omissions of density analysis on different process products. The layout pattern local density analysis method proposed in the present disclosure can accurately calculate a local density of a layout pattern.

Listed in actual operations, the comparison of the two methods is as follows:

| Product | Level | (Traditional method) Minimum value of local density | (Present disclosure) Minimum value of local density | (Traditional method) Maximum value of local density | (Present disclosure) Maximum value of local density |
|---|---|---|---|---|---|
| A | AA | 5% | 0% | 93% | 98% |
| B | PO | 6% | 3% | 96% | 100% |
| C | M1 | 2% | 0% | 87% | 95% |
| D | T2M1 | 2% | 0% | 93% | 100% |

Description of the form: the traditional method refers to a method for calculating a local density by moving an inspection window at a fixed step; and the method of the present disclosure refers to a method for calculating a local density by setting an inspection window according to the pattern attribute in a layout. From the comparison results of the minimum value/maximum values by the two methods, the method proposed in the present disclosure can more accurately calculate the extreme value density of a local pattern.

Accordingly, the embodiments of analyzing a local pattern density of a layout by means of an analysis method provided in the present disclosure have already been described. Although the present disclosure has been described with respect to certain exemplary embodiments, it will be apparent that various modifications and changes may be made to these embodiments without departing from the more general spirit and scope of the present disclosure. Accordingly, the description and the accompanying drawings are to be regarded in an illustrative rather than a restrictive sense.

It is to be understood that this description is not intended to explain or limit the scope or meaning of the claims. In addition, in the detailed description above, it can be seen that various features are combined together in a single embodiment for the purpose of simplifying the present disclosure. The method of the present disclosure should not be interpreted as reflecting the intention that the claimed embodiments may necessitate more features than those expressly listed in each claim. Rather, as reflected by the appended claims, an inventive subject matter lies in being less than all the features of a single disclosed embodiment. Therefore, the appended claims are hereby incorporated into the detailed description, with each claim standing on its own as a separate embodiment.

One embodiment or embodiments mentioned in this description is/are intended to be included in at least one embodiment of the analysis method in conjunction with a particular feature, structure, or characteristic described in the embodiment. One embodiment of phrases appearing in various places in the description is not necessarily referring to the same embodiment.

While the foregoing disclosure discusses illustrative embodiments and/or embodiments, it should be noted that various changes and modifications could be made herein without departing from the scope of the described embodiments and/or embodiments as defined by the appended claims. Furthermore, although elements of the described embodiments and/or embodiments may be described or claimed in the singular, the plural is contemplated unless limitation to the singular is explicitly stated. Additionally, all or a portion of any embodiment and/or embodiment may be utilized with all or a portion of any other embodiment and/or embodiment, unless stated otherwise.

What is claimed is:

1. A pattern density analysis method for analyzing a local pattern density of a layout, the method comprising:
    obtaining a pattern attribute of each layout pattern located on a layout region to be analyzed in the layout;
    setting, for each layout pattern, a first relevant window and a second relevant window for the layout pattern based on a corresponding pattern attribute, with each layout pattern being located inside the first relevant window, and each layout pattern being located outside the second relevant window;
    calculating a pattern density of each first relevant window and each second relevant window; and
    selecting a maximum value of the pattern densities of all the first relevant windows as a maximum local pattern density of the layout, and selecting a minimum value of the pattern densities of all the second relevant windows as a minimum local pattern density of the layout.

2. The analysis method of claim 1, wherein each layout pattern is adjacent to the second relevant window.

3. The analysis method of claim 2, wherein:
    obtaining the pattern attribute of each layout pattern further comprises obtaining vertex coordinates of the minimum circumscribed rectangle for the layout pattern; and
    setting the first relevant window and the second relevant window further comprises, for a coordinate system with each vertex of the minimum circumscribed rectangle taken as the origin, setting, in a quadrant in which the layout pattern is located, a first relevant window with the origin as the vertex, and setting, in at least one of the remaining quadrants, a second relevant window with the origin as the vertex, wherein the first relevant window and the second relevant window are rectangular.

4. The analysis method of claim 3, wherein the vertex coordinates of the minimum circumscribed rectangle are A (Xl, Yd), B (Xl, Yu), C (Xr, Yu), and D (Xr, Yd); and wherein
    Xl and Xr are the coordinates of endpoints of the layout pattern at two sides in an X direction of the layout region to be analyzed, and Yd and Yu are the coordinates of endpoints of the layout pattern at two sides in the Y direction of the layout region to be analyzed.

5. The analysis method of claim 1, wherein the analysis method further comprises:
    comparing the pattern density of each first relevant window and each second relevant window with a pre-set highest specification to mark a relevant window with the pattern density out of the pre-set highest specification; and/or
    comparing the pattern density of each first relevant window and each second relevant window with a pre-set lowest specification to mark a relevant window with the pattern density below the pre-set lowest specification.

6. The analysis method of claim 1, wherein each first relevant window and each second relevant window is a W1*W1 rectangle and, before the step of obtaining the pattern attribute, the method further comprises:
    performing preliminary screening on the layout to obtain the layout region to be analyzed, wherein the layout region to be analyzed is a W2*W2 rectangle, with W2 being greater than W1.

7. The analysis method of claim 6, wherein the step of preliminary screening further comprises:
    setting a W2*W2 inspection window;
    moving the inspection window along the X and Y directions of the layout at a step of S=½ *W2 to traverse the layout, and calculating the pattern density of the inspection window for each step;
    comparing the pattern density of the inspection window for each step with a pre-set screening specification, so as to select a layout region with the pattern density out of the pre-set screening specification in the inspection window as the layout region to be analyzed.

8. The analysis method of claim 1, wherein the pattern density is the ratio of the area having a layout pattern in the corresponding window to the area of the corresponding window.

* * * * *